J. T. FERRES.
PACKING OR SHIPPING BOX.
APPLICATION FILED SEPT. 14, 1908.
915,579.
Patented Mar. 16, 1909.
5 SHEETS—SHEET 1.
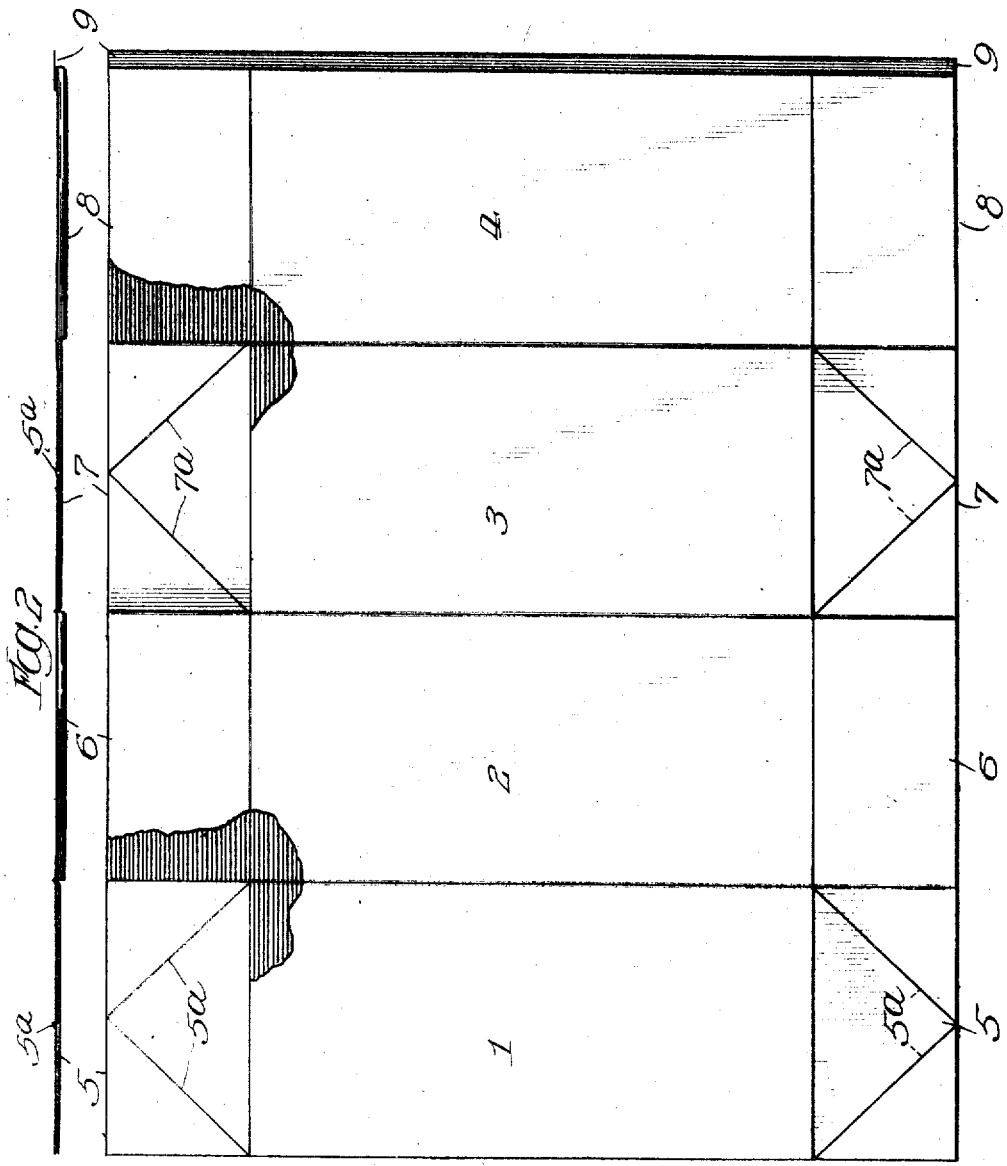

J. T. FERRES.
PACKING OR SHIPPING BOX.
APPLICATION FILED SEPT. 14, 1908.
915,579.
Patented Mar. 16, 1909.
5 SHEETS—SHEET 2.
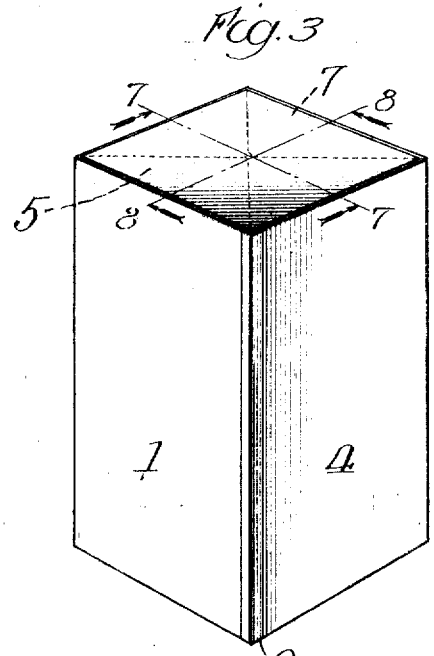
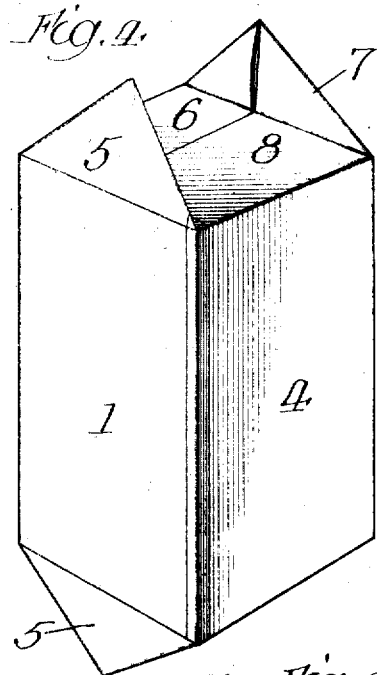
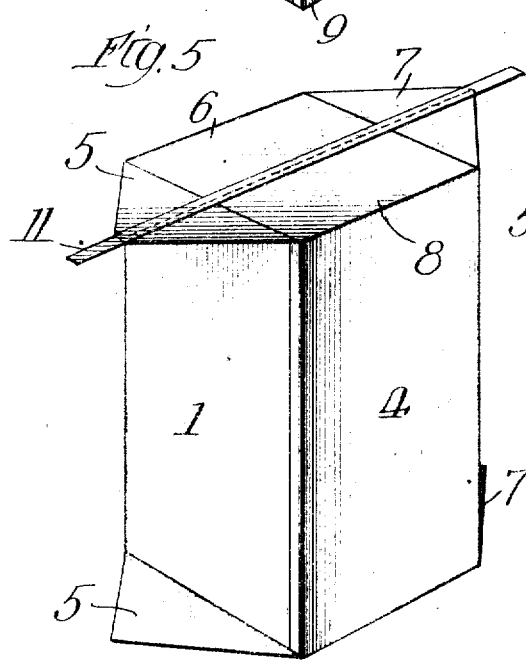
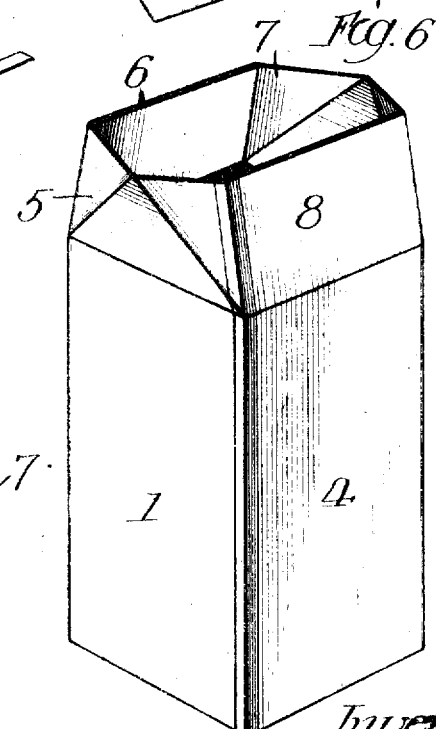
Witnesses:
Louis B. Erwin
N. G. Barrett.
Inventor.
Jeffrey T. Ferres
By Rector, Hibben & Davis
his Attys

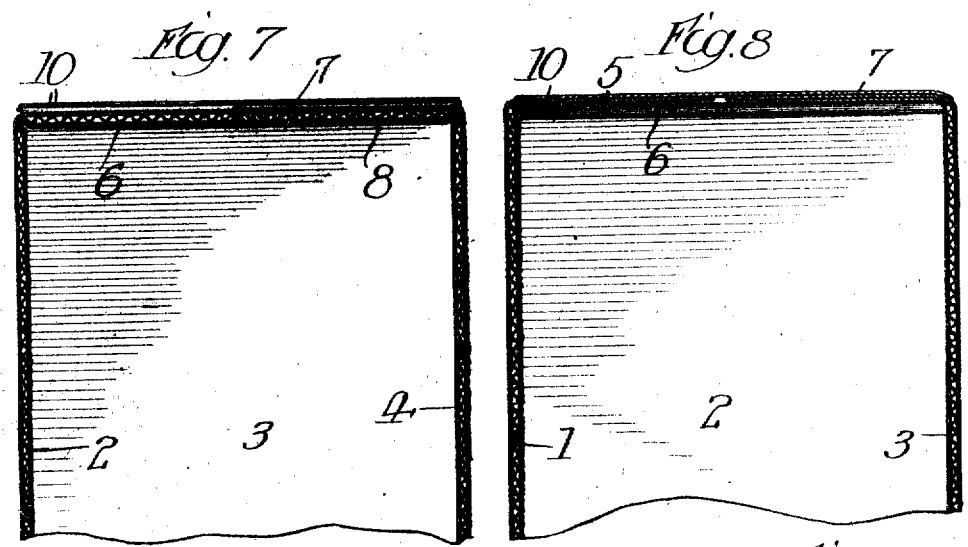
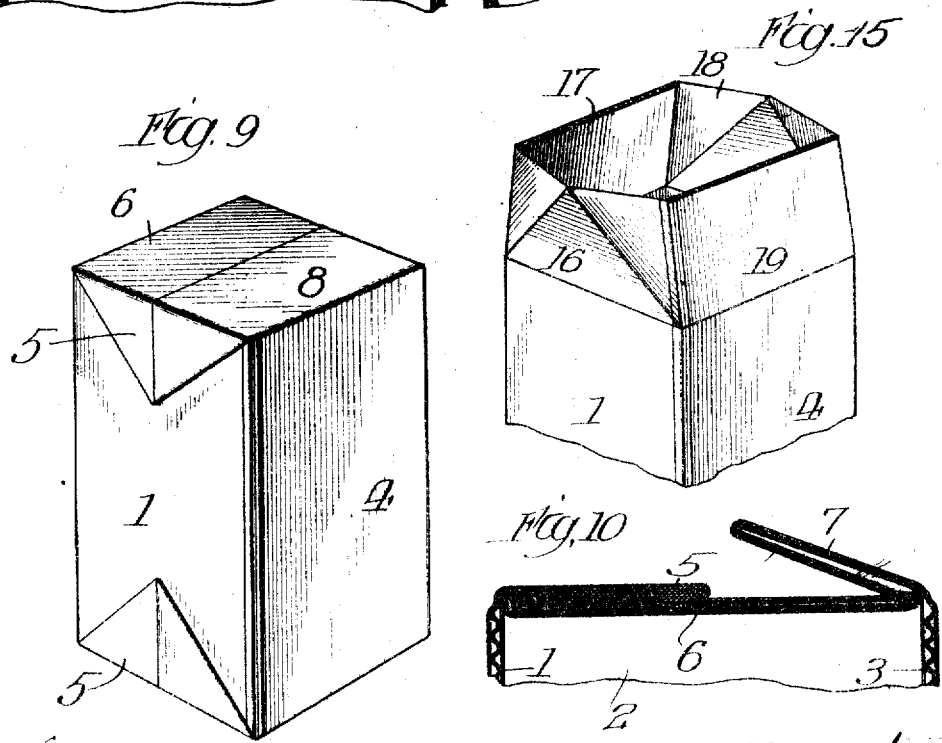

J. T. FERRES.
PACKING OR SHIPPING BOX.
APPLICATION FILED SEPT. 14, 1908.
915,579.
Patented Mar. 16, 1909.
5 SHEETS—SHEET 4.
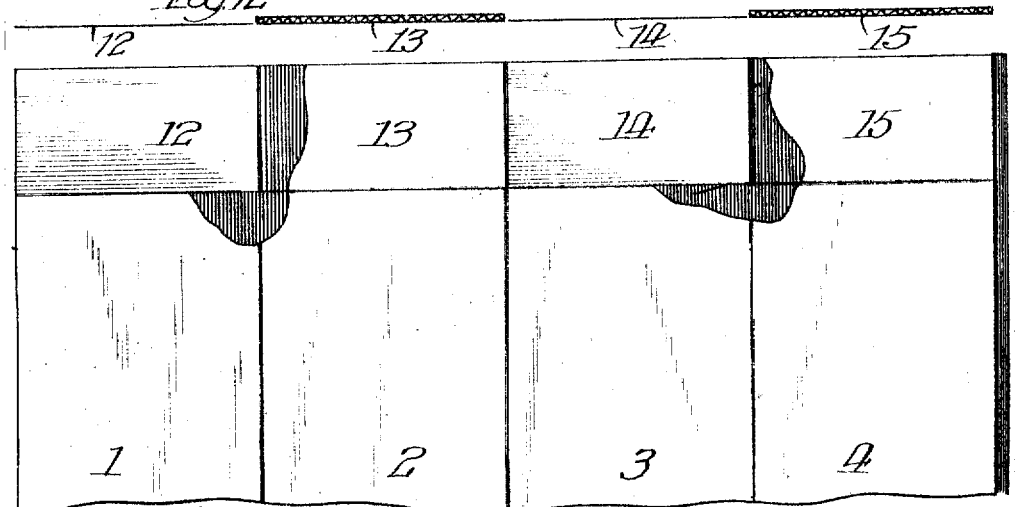
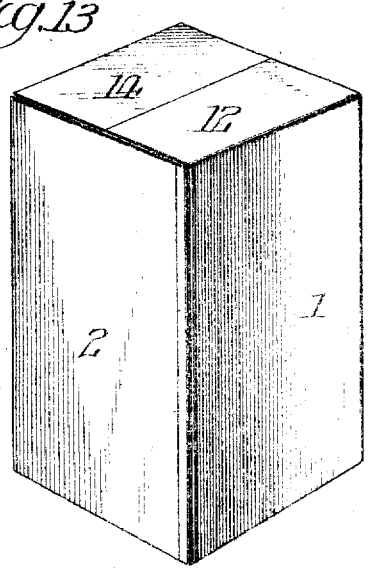
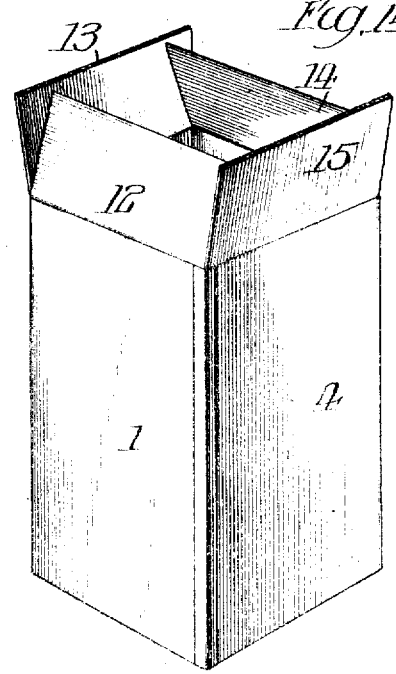

J. T. FERRES.
PACKING OR SHIPPING BOX.
APPLICATION FILED SEPT. 14, 1908.
915,579.
Patented Mar. 16, 1909.
5 SHEETS—SHEET 5.
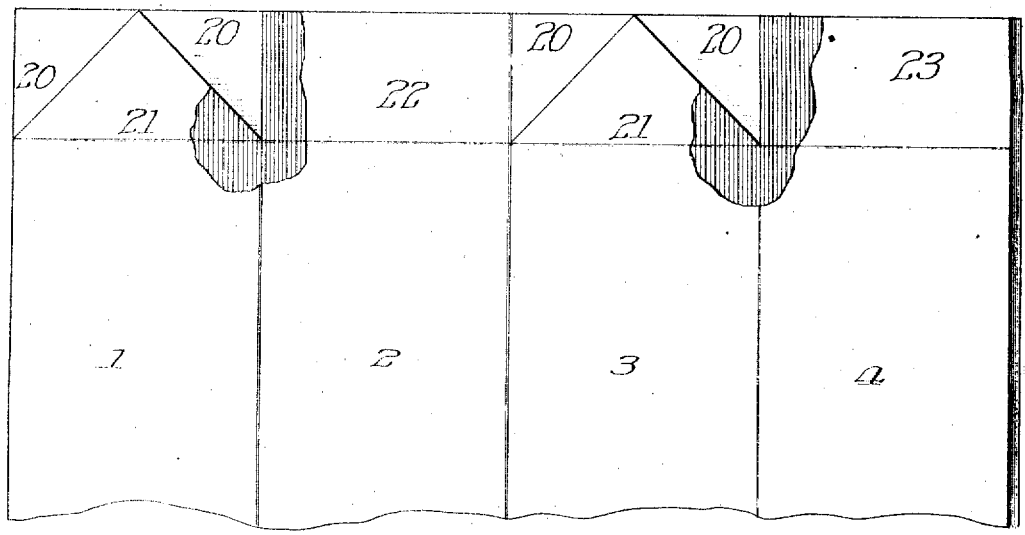
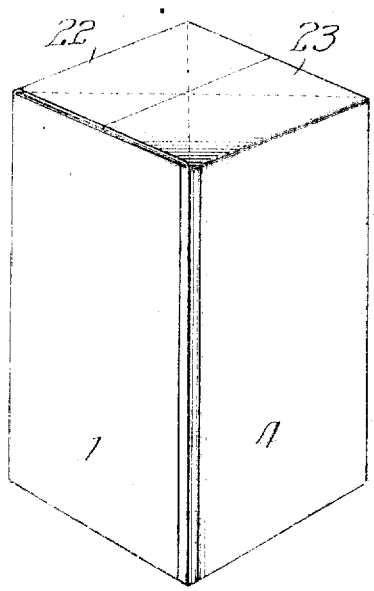
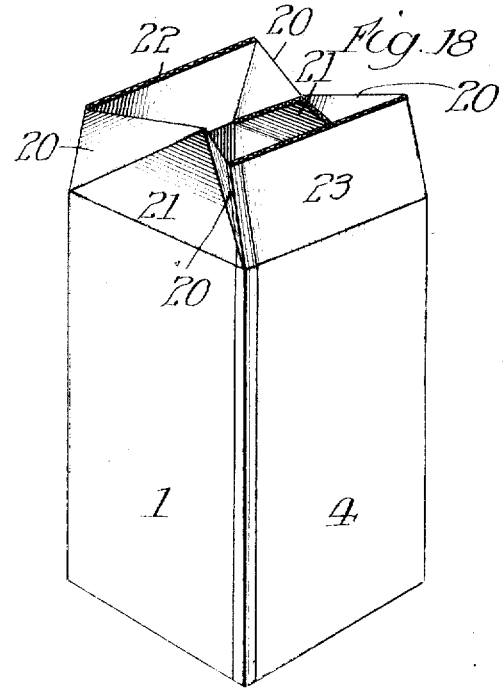

UNITED STATES PATENT OFFICE.

JEFFREY T. FERRES, OF ANDERSON, INDIANA, ASSIGNOR TO THE SEFTON MANUFACTURING COMPANY, OF ANDERSON, INDIANA, A CORPORATION OF INDIANA.

PACKING OR SHIPPING BOX.

No. 915,579.    Specification of Letters Patent.    Patented March 16, 1909.

Application filed September 14, 1908. Serial No. 452,927.

*To all whom it may concern:*

Be it known that I, JEFFREY T. FERRES, a citizen of the United States, residing at Anderson, in the county of Madison and State of Indiana, have invented certain new and useful Improvements in Packing or Shipping Boxes, of which the following is a specification.

My invention relates to boxes of the folding or collapsible type and formed of corrugated paper board, and intended for the packaging and shipment of goods.

The object of my invention is to provide a new construction of box of this character having the various features of advantage and utility which will be apparent from the description hereinafter given.

In the drawings Figure 1 is a plan view of a blank from which a box embodying my invention is formed; Fig. 2 an edge view of said blank; Fig. 3 a perspective of the box in its assembled or erect form; Fig. 4 a perspective of such box as it appears before the end flaps there shown in vertical position are folded downwardly in position; Fig. 5 a perspective of said box showing another method of folding the said flaps as compared with the box illustrated in Fig. 3; Fig. 6 a perspective of the box showing the end flaps or extensions open; Figs. 7 and 8 sections on the lines 7—7 and 8—8 respectively of Fig. 3 but made on a somewhat larger scale; Fig. 9 a perspective of a box of modified construction; Fig. 10 a cross section of a box of the structure illustrated in Figs. 1 to 8 illustrating the crushed character of two of the end flaps in a somewhat diagrammatic and exaggerated manner; Fig. 11 a plan view of a portion of a blank illustrating a modified form of box; Fig. 12 an edge view thereof; Fig. 13 a perspective of a box made from said modified blank; Fig. 14 a perspective showing said modified form of box with the top end flaps or extensions open; Fig. 15 a perspective of the upper end of another modified form of box, showing the top flaps open; Fig. 16 a plan view of a portion of another modified form of blank; Fig. 17 a perspective of a box formed from the blank of Fig. 16; and Fig. 18 a perspective of said box with the top end flaps open.

As hereinbefore stated my box is formed from corrugated paper board and in the present instance I employ the so-called double-faced corrugated paper board comprising as usual the two facing strips or sheets and the interposed corrugated strip. Speaking in general terms, my invention contemplates the forming of boxes from this double-faced corrugated board and either crushing down and flattening the corrugated board as to certain of the end flaps or extensions or the cutting away or removal of the inner facing strip and the corrugated strip either in whole or in part from such end extensions or flaps of the box, with the result that the end closures of the box may be the better and more conveniently formed than if such flaps remained of the corrugated paper board structure. Thus, while the box may be said to be made of corrugated paper board, the corrugated character of certain of the end flaps or extensions has been destroyed.

Referring to that form of box made from a blank of double-faced corrugated paper board, illustrated in Figs. 1 to 9, in which said end flaps are crushed down and the corrugated character thereof thereby destroyed, the corrugated board is properly scored and creased into the form of blank shown in Fig. 1 whereby there results the four similar sides 1, 2, 3 and 4 having at their opposite ends the extensions or flaps 5, 6, 7 and 8 respectively. It will be understood that the blanks are made of any desired size and dimensions according to the size or character of box required. With the exception of the pairs of flaps 5 and 7, the box is composed of double-faced corrugated board, said flaps being originally composed of such corrugated board but subsequently crushed or flattened down in suitable manner so that these flaps are made up of three layers or thicknesses of the paper, to-wit, the two facing strips and what was the corrugated strip. This crushing of these end flaps enables them to be conveniently folded either inwardly or outwardly and in fact according to any kind of fold that may be desired. In the present instance, however, the flaps 5 are creased, being provided with oblique score lines $5^a$ meeting at their outer ends at the edge of the blank and the flaps 7 have similar score lines $7^a$. It will be understood that in the formation of the box the sides 1 and 4 are secured in any suitable manner at their outer or free edges as for instance by means of the tape 9.

When the box is assembled or folded as illustrated in Figs. 3 and 4 the end flaps 6 and 8 are turned inwardly from the open position illustrated in Fig. 6, such end flaps being of a size so as by preference to meet at the center line of the box as illustrated in Fig. 4. The other pairs of flaps 5 and 7 thereupon fold to the triangular form illustrated in said latter figure. These triangular flaps are now folded inwardly and upon the upper surface of the other flaps 6 and 8 and may be secured to the latter in any suitable manner, as by means of glue in order to close and seal the package. If desired a cap sheet 10 may be applied and glued to the ends of the box to more effectually seal the same and present a smooth surface. However, if desired the flaps 5 and 7, instead of being turned downwardly upon the ends of the box, may be turned or folded outwardly and then downwardly upon the sides of the box, as illustrated in Figs. 5 and 9. Also if desired, a tape 11 or the like may be glued or pasted over the meeting line of the flaps 6 and 8 and also to the said flaps 5 and 7, thereby strengthening the structure and sealing said joint. Said tape may equal the distance between the outer ends of the flaps or, as shown in Fig. 5, it may be of sufficient length to extend down on to the sides of the box 1 and 3 to hold the ends down and cap sheet 10 may then be added if desired. Such tape may also be used in the same manner in connection with the box illustrated in Figs. 3 and 4. It will be understood that said flaps 5 and 7 may fold inwardly underneath the other flaps instead of outwardly as shown, such inward folding being illustrated in Fig. 18 in connection with a modified form hereinafter described.

It will now be apparent that the crushing of certain of the end flaps and the consequent destruction of the corrugated board structure thereof enables such flaps to be readily folded in different ways and in a convenient manner without materially detracting from the strength of the end closures of the box.

As hereinbefore stated, the corrugated character of the end flaps 5 and 7 may be destroyed by removing in whole or in part the corrugated strip and one of the facing strips. The construction in which such strips are wholly removed is illustrated in Figs. 11 to 15 and the other construction in which such strips are in part removed is illustrated in Figs. 16 to 18.

Referring to the box shown in Figs. 11 to 14, the same comprises side walls 1, 2, 3 and 4 as in the form already described and end flaps or extensions 12, 13, 14 and 15, it being understood that both ends of the box are similarly provided with flaps. By preference, these flaps are not hinged together, being separated from each other by slits as seen in Fig. 11. With the exception of the flaps 12 and 14, the entire box is made of double faced corrugated board and as to said flaps, the same consists merely of the outer facing strip, the inner facing strip and the corrugated strip having been removed. In practice, the corrugated board flaps 13 and 15 are folded inwardly first and the plain flaps 12 and 14 are then folded down thereupon and preferably glued to the first named flaps, Fig. 13, after which, if desired, cap sheets may be applied to the ends of the box, this not, however, being as desirable in this instance as in the case of the box shown in Fig. 3.

In the form of box just described the end flaps 12 and 14 are separated from each other and do not fold except of course upon their respective side walls, but if desired such end flaps may be hinged to each other and be so scored and creased as to fold in the same manner (either inwardly or outwardly) as in respect to the box illustrated in Figs. 1 to 9. Such modified form of box is shown in Fig. 15, in which the end flaps 16 and 18 are of the plain paper, that is merely the facing strip, whereas the flaps 17 and 19 are of the corrugated board character. The flaps 16 and 18 are obliquely scored in the same manner as the end flaps 5 and 7 hereinbefore described and fold in a similar manner.

Referring next to that form of box in which the corrugated character of two flaps at each end of the box is removed in part, the same is illustrated in Figs. 16, 17 and 18. In these figures the parts corresponding to those previously described are indicated by the same reference characters, such box being the same as the others hereinbefore described with the exception of those end flaps which are folded. As clearly indicated in Figs. 16 and 18, two of the four end flaps of each end of the box have the inner facing strip and corrugated strip removed in part, forming as to each end thereof the two triangular portions 20 and a third triangular portion 21 of the same corrugated board structure as the remainder of the blank. These particular end flaps, which need not be scored, may be folded either inwardly upon the ends of the box or outwardly upon the sides thereof. The remaining flaps 22 and 23 are left intact, that is of the corrugated board structure. As indicated in Fig. 18, these particular end flaps are folded inwardly in advance of the other end flaps 6 and 8. This particular construction of the end flaps enables the folding to take place conveniently and properly and at the same time practically the entire original strength of the flaps is retained.

As in the case of the box in which certain of the end flaps are crushed down, the removal of the corrugated strip and one of the facing strips in whole or in part, as described, enables such flaps to be readily and conveniently folded and strong, efficient and comparatively smooth end closures to be provided.

I claim:

1. A packing or shipping box comprising sides hinged together and flaps hinged to the ends of the sides, the box being originally made wholly from corrugated paper board but subsequently having the corrugated character eliminated as to two end flaps at each end of the box.

2. A packing or shipping box comprising sides hinged together and flaps hinged to the ends of the sides, the box being originally made wholly from corrugated paper board but subsequently having the corrugated character eliminated as to two end flaps at each end of the box, said particular flaps being creased for folding purposes.

3. A packing or shipping box comprising sides hinged together and flaps or extensions hinged to the ends of the sides, the box being formed of corrugated paper board and two end flaps being crushed down and the corrugated character thereof thereby eliminated.

4. A packing or shipping box comprising sides hinged together and flaps or extensions hinged to the ends of the sides, two opposite flaps at each end of the box being creased for folding purposes, the box being formed of corrugated paper board and the corrugations of the creased flaps being crushed down, said creased flaps together with the other flaps being foldable to form the ends of the box.

5. A packing or shipping box comprising sides hinged together and flaps or extensions hinged to the ends of the sides, two opposite flaps at each end of the box being creased for folding purposes, the box being formed of corrugated paper and the corrugations of the creased flaps being crushed down, said creased flaps together with the other flaps being foldable to form the ends of the box, and cap sheets secured to and sealing such ends of the box.

6. A packing or shipping box comprising sides hinged together and flaps or extensions hinged to the ends of the sides, the sides of the box and certain of the end flaps being formed of double faced corrugated board consisting of inner and outer facing strips and an interposed corrugated strip, the remainder of said flaps being uncorrugated but composed of the same material as the remainder of the box.

7. A packing or shipping box comprising sides hinged together and flaps or extensions hinged to the ends of the sides, the sides of the box and certain of the opposite end flaps being formed of double faced corrugated board consisting of inner and outer facing strips and an interposed corrugated strip, the remainder of said flaps being uncorrugated but composed of the same material as the remainder of the box and being diagonally creased to form three triangular portions.

8. A packing or shipping box comprising sides hinged together and flaps or extensions hinged to the ends of the sides, the sides of the box and certain of the opposite end flaps being formed of double faced corrugated board consisting of inner and outer facing strips and an interposed corrugated strip, the remainder of said flaps being uncorrugated but composed of the same material as the remainder of the box all of said flaps being foldable to form the ends of the box, and cap sheets secured to and sealing such box ends.

9. A packing or shipping box comprising sides hinged together and flaps or extensions hinged to the ends of the sides, the sides of the box and certain of the opposite end flaps being formed of double faced corrugated board consisting of inner and outer facing strips and an interposed corrugated strip, the remainder of said flaps being uncorrugated but composed of the same material as the remainder of the box all of said flaps being foldable to form the ends of the box, and tapes secured to the box ends along the joints between the flaps and extending upon the outer sides of the box and secured thereto.

10. A packing or shipping box comprising the four sides 1, 2, 3 and 4 hinged together to form the box body and flaps 5, 6, 7 and 8 hinged to each end of the sides to form the box ends, the sides and also the pairs of flaps 6 and 8 being formed of double-faced corrugated paper board but the other pairs of flaps 5 and 7 being originally formed of such board but being crushed down and creased for folding purposes.

JEFFREY T. FERRES.

Witnesses:
S. E. HIBBEN,
LOUIS B. ERWIN.